(12) United States Patent
Hirai

(10) Patent No.: US 8,720,630 B2
(45) Date of Patent: May 13, 2014

(54) MOTORCYCLE

(75) Inventor: Fumiyasu Hirai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 892 days.

(21) Appl. No.: 12/327,689

(22) Filed: Dec. 3, 2008

(65) Prior Publication Data

US 2009/0166118 A1    Jul. 2, 2009

(30) Foreign Application Priority Data

Dec. 28, 2007   (JP) ................................. 2007-338781

(51) Int. Cl.
*B62J 17/02*          (2006.01)
(52) U.S. Cl.
USPC ............. 180/219; 40/200; 280/852; 293/105; 296/78.1
(58) Field of Classification Search
USPC ............... 180/219; 280/152.3, 852; 296/78.1, 296/192, 180.1, 195.1; 40/209, 204, 590, 40/200, 911, 591, 593; 293/65, 105; 116/62.1; 362/503, 911, 591
See application file for complete search history.

(56) References Cited

U.S. PATENT DOCUMENTS

| | | | | |
|---|---|---|---|---|
| 4,019,774 A | * | 4/1977 | Tsukahara et al. | 296/78.1 |
| 4,570,740 A | * | 2/1986 | Hara | 180/229 |
| 6,446,374 B1 | * | 9/2002 | Ardiff | 40/593 |
| 7,422,648 B1 | * | 9/2008 | Kassab | 156/267 |
| 7,841,641 B2 | * | 11/2010 | Ohzono | 296/78.1 |
| 2004/0221498 A1 | * | 11/2004 | Vico et al. | 40/593 |
| 2004/0264204 A1 | * | 12/2004 | Toyofuku | 362/473 |
| 2009/0127884 A1 | * | 5/2009 | Takahashi et al. | 296/96 |

FOREIGN PATENT DOCUMENTS

| | | | |
|---|---|---|---|
| DE | 003941875 | * | 6/1991 |
| JP | 58-056977 | | 4/1983 |
| JP | 5-254472 | * | 10/1993 |
| JP | 6-206586 | * | 7/1994 |

* cited by examiner

*Primary Examiner* — Anne Marie Boehler
(74) *Attorney, Agent, or Firm* — Keating & Bennett, LLP

(57) ABSTRACT

A motorcycle in which a plate member can be mounted to a front cover disposed above a headlight. The front cover includes a front cover main body portion and a hole formed in the front cover main body portion. The front cover main body portion is provided at a back side thereof with a mount portion for a bracket having a portion passing through the hole. The portion passing through the hole includes a retaining portion for retaining the plate member in front of the front cover main body portion.

7 Claims, 4 Drawing Sheets

MOTORCYCLE

RELATED APPLICATIONS

This application claims the benefit of priority under 35 USC 119 of Japanese patent application no. 2007-338781, filed on Dec. 28, 2007, which is hereby incorporated by reference.

BACKGROUND OF THE INVENTION

1. Field of the Invention

The present invention relates to a motorcycle and particularly to a motorcycle having a front cover disposed above a headlight.

2. Description of Related Art

Motorcycles are often provided with a front cover for covering a headlight in front of a vehicle body in order to protect a rider from flowing air, reduce traveling resistance, and improve appearance (see, for example, Japanese Patent Laid-Open Application No. 58-56977). Although such prior-art front covers protect the rider from flowing air, reduce traveling resistance, and improve appearance, they are limited in that they do not provide other functions.

SUMMARY OF THE INVENTION

The inventor has addressed this drawback of the prior art and has increased the degree of design freedom of the motorcycle by adding a new function to the front cover. In particular, a plate member can be mounted to the front cover.

A motorcycle according to the present invention includes a front cover disposed above a headlight. The front cover includes a front cover main body portion and a hole formed in the front cover main body portion. The front cover main body portion is provided at a back side thereof with a mount portion for a bracket having a portion passing through the hole.

According to the motorcycle of the invention, the front cover main body portion of the front cover is provided at the back side thereof with the mount portion for the bracket having the portion passing through the hole formed in the front cover main body portion. Therefore, if the portion passing through the hole has a retaining portion for retaining a plate member in front of the front cover main body portion, the plate member can be mounted in front of the front cover main body portion.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
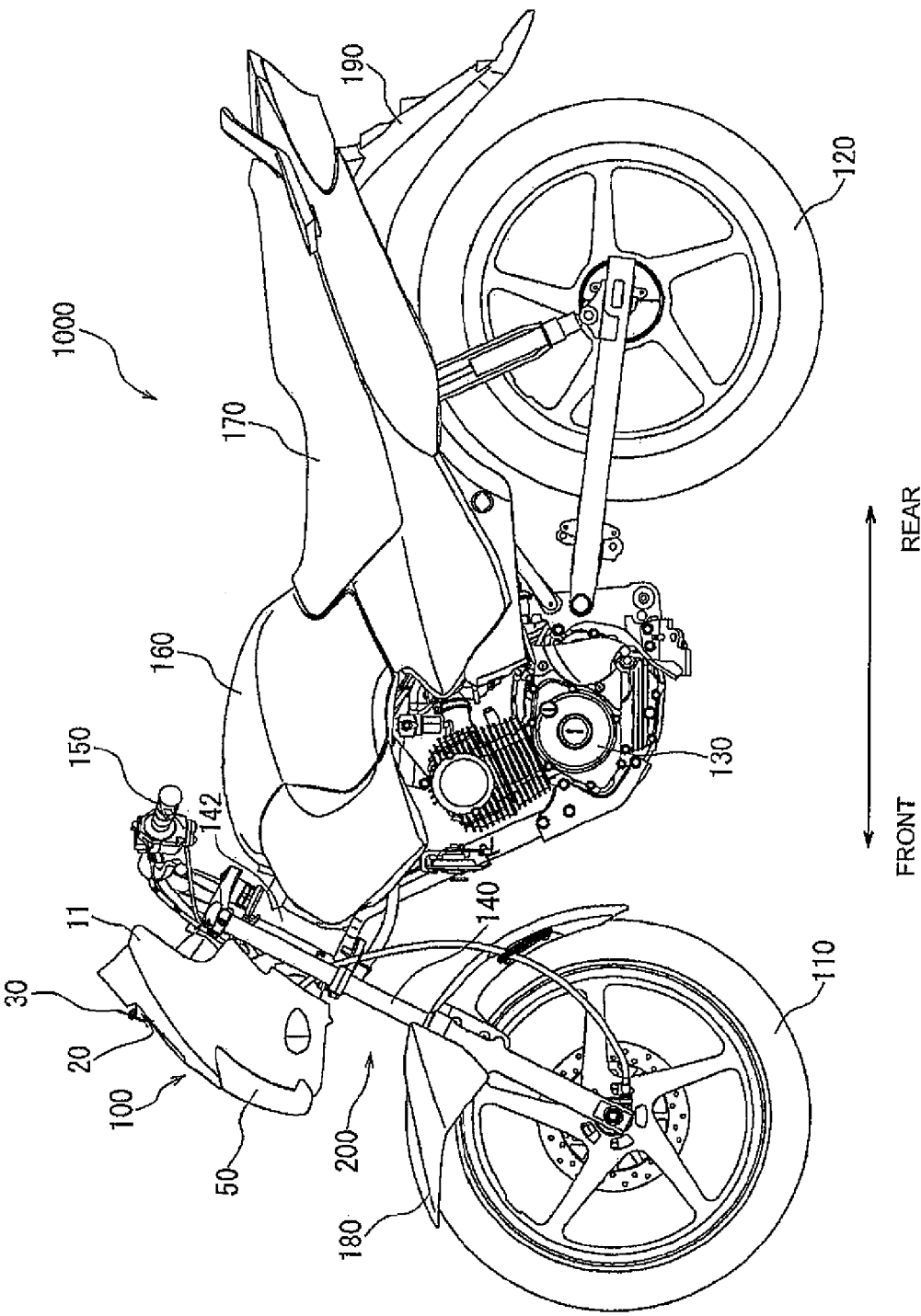
FIG. 1 is a side view of a motorcycle according to an embodiment of the present invention.

An embodiment of the invention is now described with reference to the drawings. In the drawings, components having substantially the same functions are designated with the same reference numerals to simplify the description. The invention is not limited to the following embodiment.

A motorcycle 1000 according to an embodiment of the invention is described with reference to FIGS. 1-4. FIG. 1 is a side view of motorcycle 1000. As shown in FIG. 1, motorcycle 1000 includes a drive source (engine) 130 provided between a front wheel 110 and a rear wheel 120. Front wheel 110 is rotatably supported by front forks 140 and is covered with a front fender 180, while rear wheel 120 is covered with a rear fender 190.

Front forks 140 are connected to handlebars 150 with head pipes 142 interposed therebetween. A fuel tank 160 and a seat 170 on which a rider is seated are provided behind handlebars 150. Rear (driving) wheel 120 is positioned below (or diagonally behind and below) seat 170. A headlight 50 is positioned in front of handlebars 150. A front cover 100 is provided above headlight 50. In this embodiment, headlight 50 is covered by front cover 100.

Figure 2:
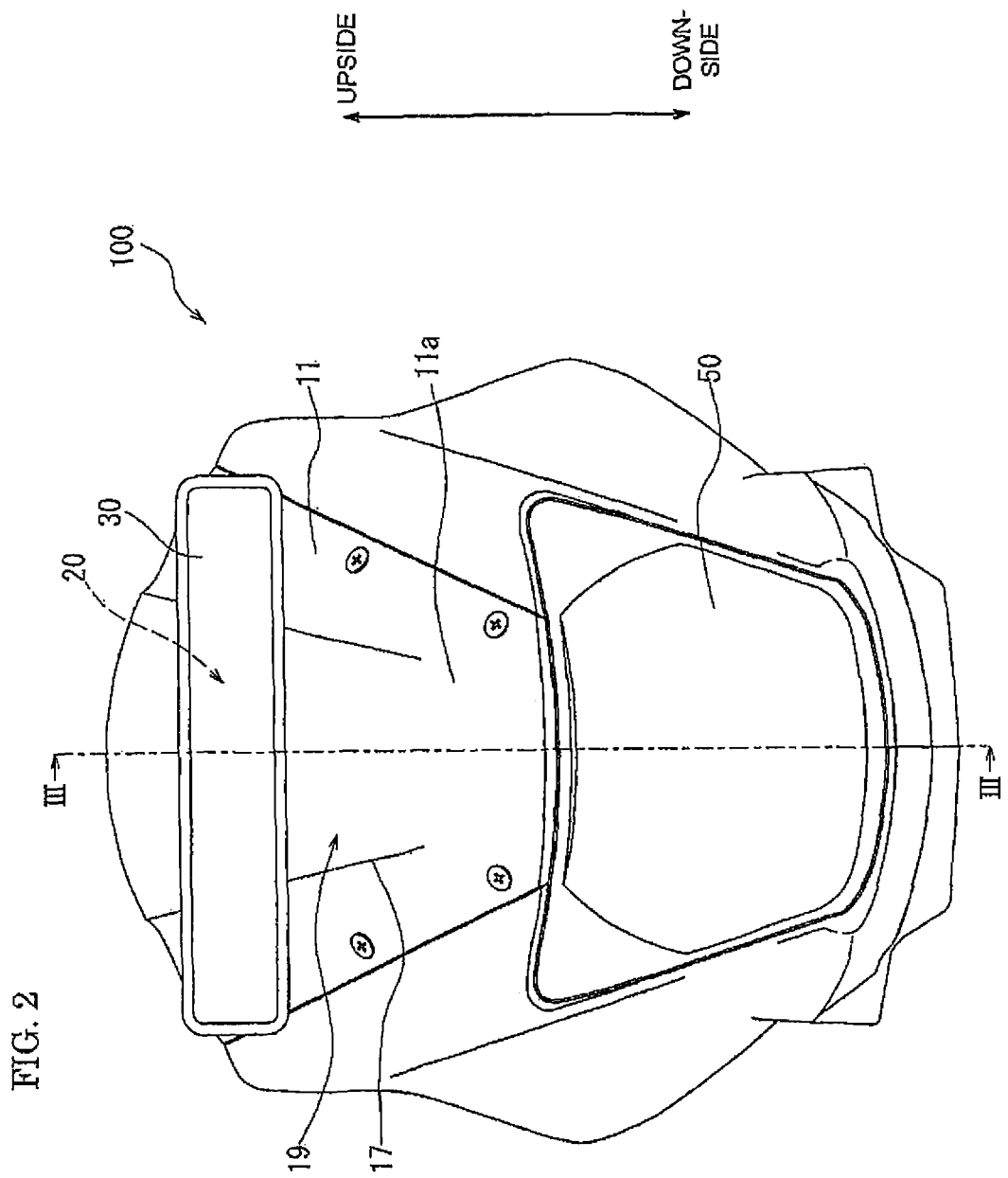
FIG. 2 is a front view of a front cover of the motorcycle of FIG. 1.
Figure 3:
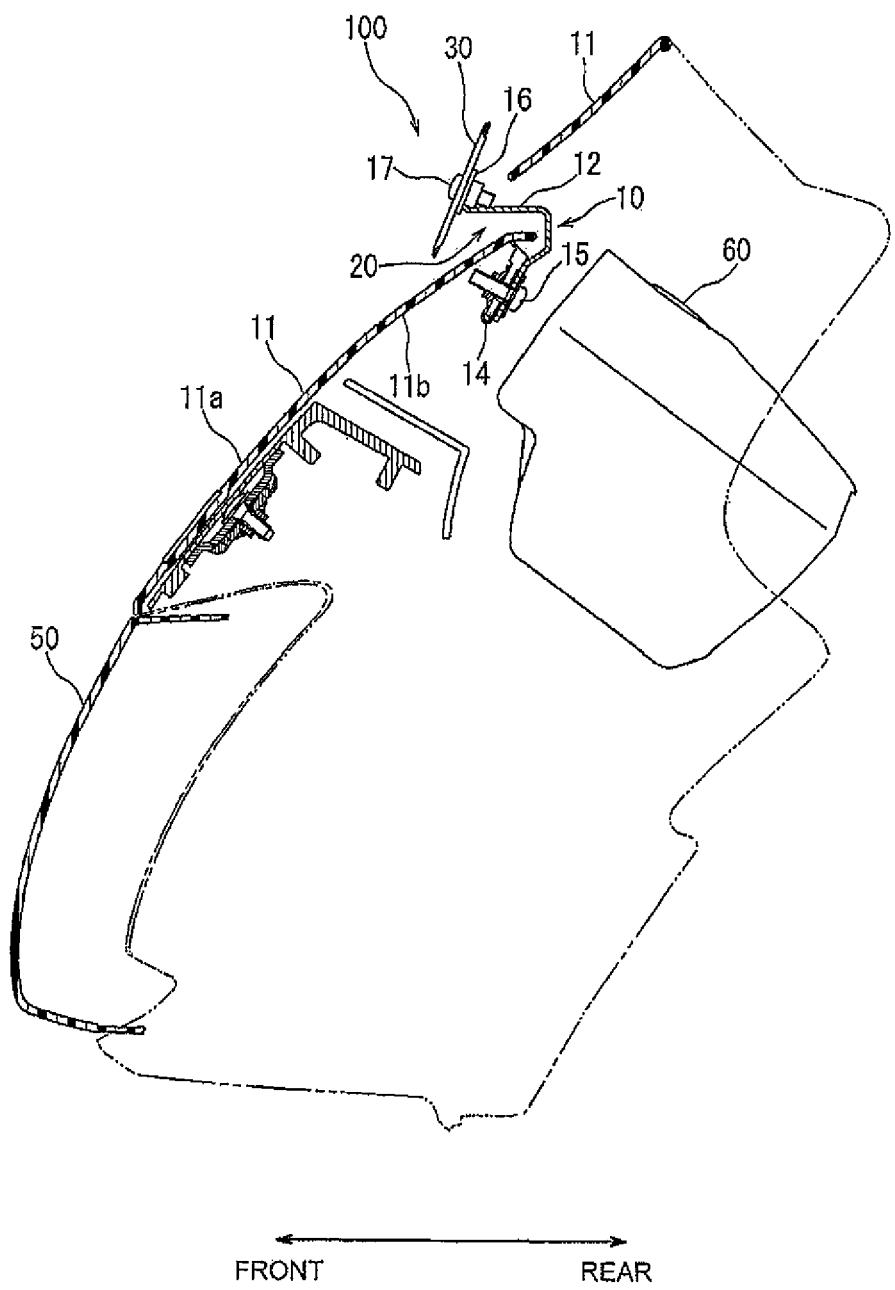
FIG. 3 is a sectional view taken along line III-III of FIG. 2.
Figure 4:
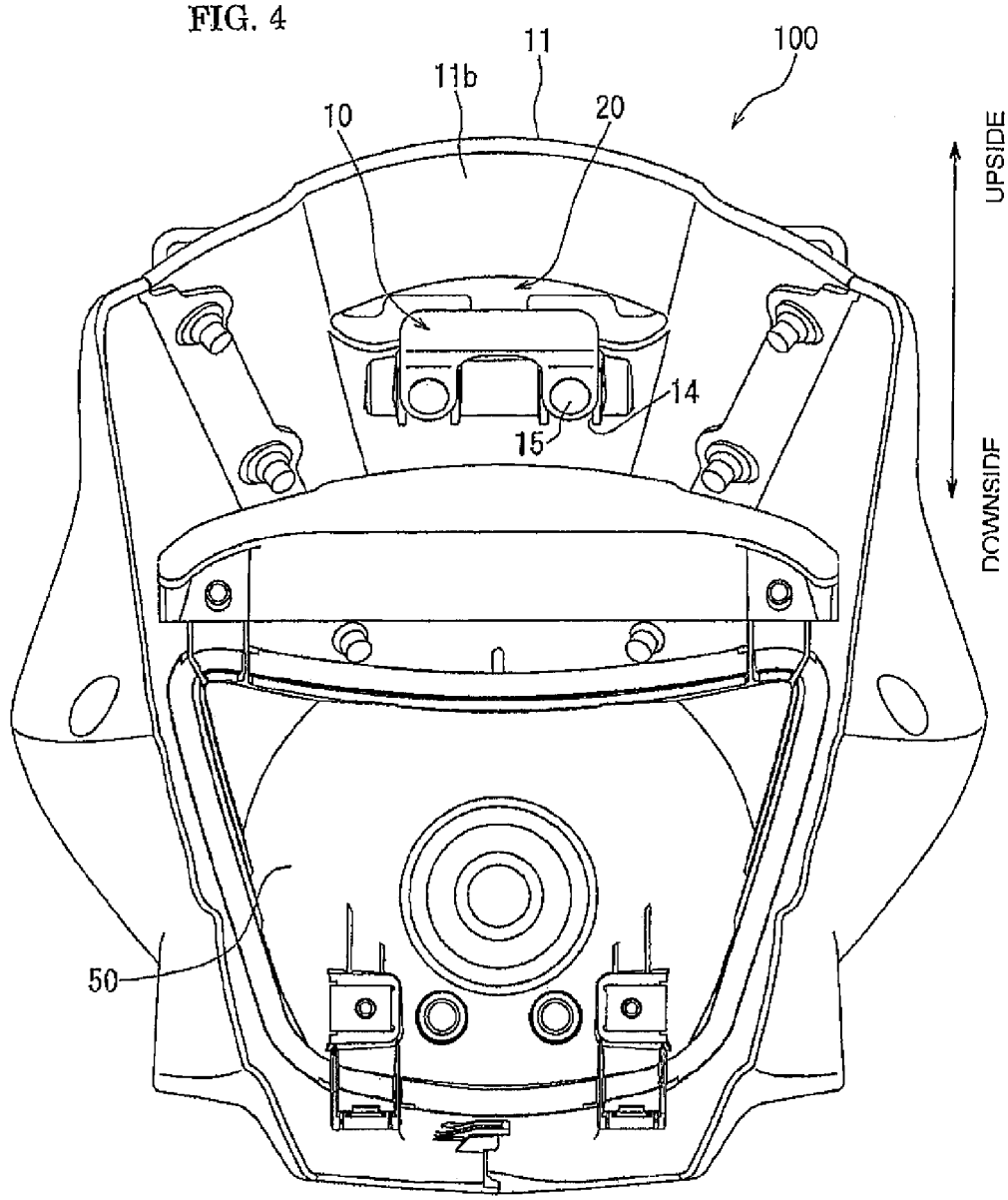
FIG. 4 is a rear view of the front cover of FIG. 2.

FIG. 2 is a front view of front cover 100. FIG. 3 is a sectional view taken along line III-III of FIG. 2. FIG. 4 is a rear view showing a back of front cover 100, i.e., a view from handlebars 150.

Front cover 100 includes a front cover main body portion 11 and a hole 20 formed in front cover main body portion 11. Front cover main body portion 11 may be made of resin, for example, and may have a thickness of 2-3 mm, for example.

Hole 20 passes through front cover main body portion 11 from a surface 11a to a back face 11b. Hole 20 extends along a front-back direction of motorcycle 1000 as shown in FIG. 3. Moreover, hole 20 extends in the direction along surface 11a of front cover main body portion 11.

A mount portion 14 for a bracket 10 having a portion 12 passing through hole 20 is provided behind front cover main body portion 11. Portion 12 passing through hole 20 includes a retaining portion 16 for retaining a plate member 30 in front of front cover main body portion 11. Retaining portion 16 has such a structure as to be able to retain plate member 30. For example, plate member 30 may be fixed to retaining portion 16 by fastening members such as screws, pins, etc.

Mount portion 14 of bracket 10 is disposed near the back of front cover main body portion 11 and on a side of back face 11b of front cover main body portion 11. In this embodiment, mount portion 14 is made of the same material as front cover main body portion 11 and is fixed to bracket 10 using fastening members (e.g., screws) 15.

In one embodiment, plate member 30 is a license plate. Bracket 10 is a support member for the license plate and is formed of a steel sheet, for example. Portion 12 of bracket 10 passing through hole 20 may be a member formed by bending a steel sheet or a stick-shaped member.

As shown in FIG. 3, a meter 60 for motorcycle 1000 is disposed behind front cover main body portion 11. Between front cover main body portion 11 and meter 60, mount portion 14 for bracket 10 is provided.

As shown in FIG. 2, surface ha of front cover main body portion 11 is formed with a recessed portion 19 sandwiched between ridge lines 17. In the embodiment, hole 20 is formed at part of recessed portion 19. Ridge lines 17 are a pair of left and right ridge lines 17. Hole 20 is formed across surface 11a of front cover main body portion 11 between left ridge line 17 and right ridge line 17. Hole 20h as a rectangular or elliptic shape, for example.

In motorcycle 1000 of the embodiment, hole 20 is formed in front cover main body portion 11 of front cover 100, and mount portion 14 for bracket 10 having portion 12 passing through hole 20 is formed at the back side of front cover main body 11. Because portion 12 passing through hole 20 has retaining portion 16 for retaining plate member 30 (here, a license plate) in front of front cover main body portion 11, plate member (license plate) 30 can be mounted in front of front cover main body portion 11. Because the license plate can be mounted in front of front cover main body portion 11, the degree of freedom in design of motorcycle 1000 is increased.

According to the prior art, if a license plate is required at a front portion of the motorcycle, it would need to be mounted, for example, around front forks 140 and positioned between headlight 50 and front fender 180 of the motorcycle of FIG. 1. In this case, because license plate 30 is mounted between headlight 50 and front fender 180, a large space is required between headlight 50 and front fender 180, which restricts the design of the vehicle. According to the present invention, by contrast, the license plate can be mounted in front of front cover 100 and the degree of design freedom of the portion between front cover 100 and front fender 180 including headlight 50 is thereby increased.

Moreover, because front cover 100 is formed with hole 20 passing through front cover main body portion 11 from surface 11a to back face 11b, a straightening function of flowing air that blows against cover 100 is provided. In particular, because recessed portion 19 sandwiched between ridge lines 17 is formed on surface 11a of front cover main body portion 11 and hole 20 is formed in part of recessed portion 19, the flow of the flowing air is facilitated along recessed portion 19 sandwiched between ridge lines 17, which increases the effect of the straightening function. Furthermore, because hole 20 is formed to be wide between the left and right ridge lines 17, it the effect of the straightening function is reliably obtained.

Although plate member 30 has been described as a license plate, other plate members such as, for example, an emblem plate can be mounted. Moreover, not only plate members but other members (e.g., an emblem) can be mounted.

Although the invention has been described by way of an exemplary embodiment, this description is not restrictive and various changes can be made and are within the scope of the invention, as defined by the following claims.

According to the invention, a front fork mount structure including a small number of parts, and a saddle-type vehicle having the front fork mount structure, are provided.

The invention claimed is:

1. A motorcycle including a front cover disposed above a headlight, the front cover comprising:
a front cover main body portion;
a hole provided in the front cover main body portion;
a bracket; and
a plate member; wherein
the front cover main body portion is provided at a back side thereof with a mount portion arranged to mount the bracket thereto;
the bracket includes a portion that passes through the hole;
the plate member is mounted on the portion of the bracket that passes through the hole;
a topmost portion of the front cover main body portion extends farther upward than a topmost portion of the plate member; and
the plate member is a license plate.

2. A motorcycle according to claim 1, wherein
the portion of the bracket that passes through the hole includes a retaining portion arranged to retain the plate member in front of the front cover main body portion; and
the mount portion is disposed near the back side of the front cover main body.

3. A motorcycle according to claim 1, wherein a meter is disposed behind the front cover main body; and
the mount portion is provided between the front cover main body portion and the meter.

4. A motorcycle according to claim 1, wherein
a surface of the front cover main body portion is provided with a recessed portion sandwiched between ridge lines; and
the hole is provided at a portion of the recessed portion on the surface of the front cover main body portion.

5. A motorcycle according to claim 4, wherein
the ridge lines are a pair of left and right ridge lines; and
the hole is provided across the surface of the front cover main body portion between the left ridge line and the right ridge line.

6. A motorcycle according to claim 1, wherein the hole passes through the front cover along a front-back direction of the motorcycle.

7. A motorcycle comprising a front cover disposed above a headlight, the front cover comprising:
a front cover main body portion; and
a hole provided in the front cover main body portion;
a bracket; and
a plate member; wherein
the hole passes through the front cover main body portion from a surface to a back face;
the bracket includes a portion that passes through the hole from the back face to the surface;
the plate member is mounted on the portion of the bracket that passes through the hole;
a topmost portion of the front cover main body portion extends farther upward than a topmost portion of the plate member; and
the plate member is a license plate.

* * * * *